March 12, 1940. J. DEL REA DE LAND 2,193,062
WIND CONTROL MEANS FOR PROTECTING ORCHARDS AND FIELDS
Filed Dec. 17, 1937
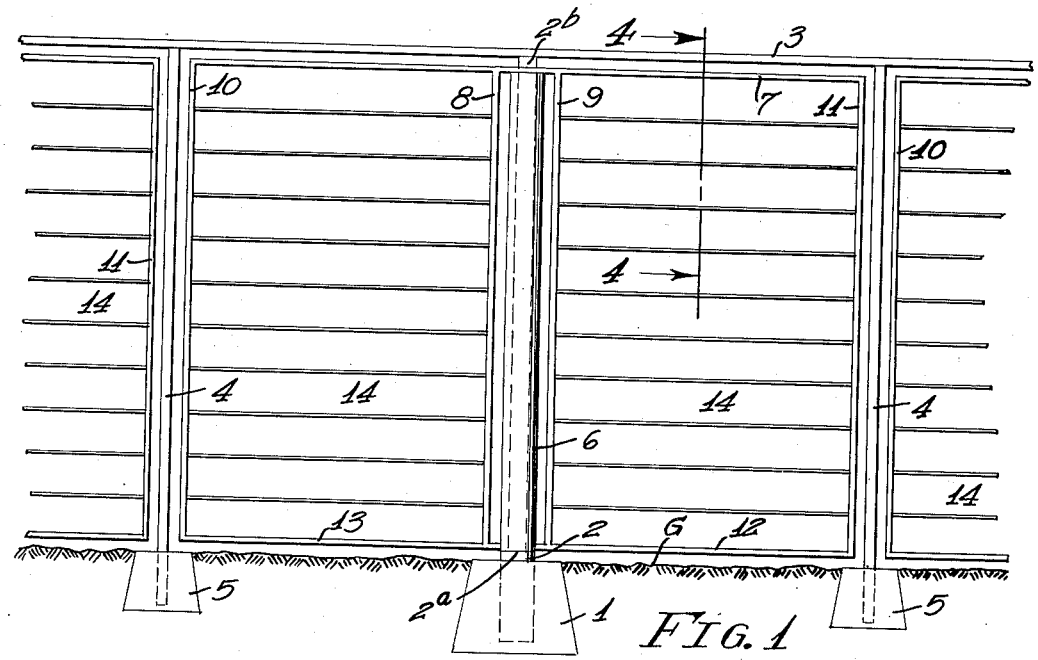
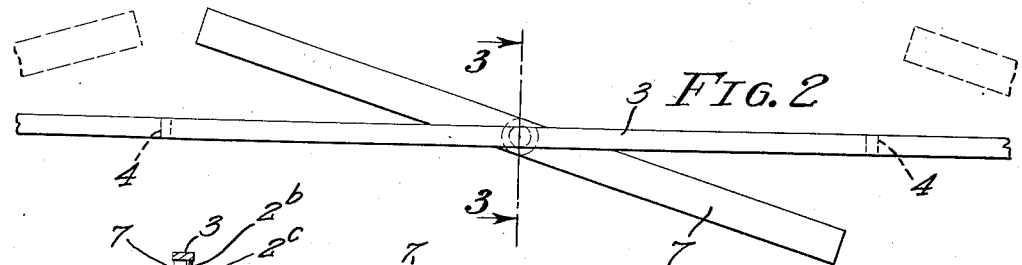
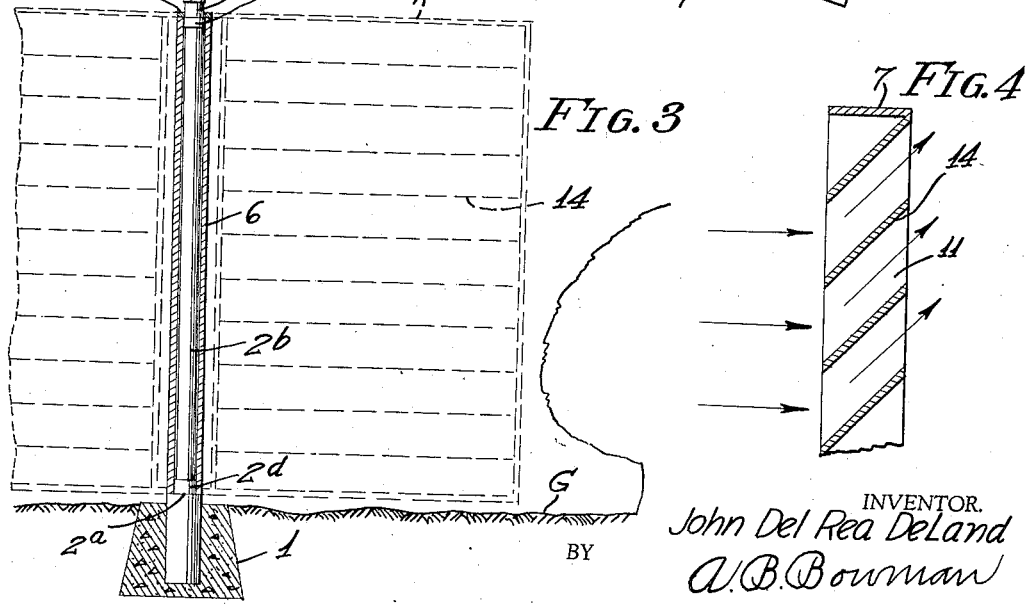
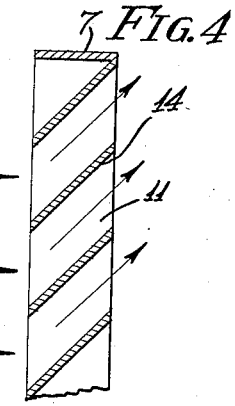
INVENTOR.
John Del Rea DeLand
BY A. B. Bowman
ATTORNEY.

Patented Mar. 12, 1940

2,193,062

UNITED STATES PATENT OFFICE 2,193,062

WIND CONTROL MEANS FOR PROTECTING ORCHARDS AND FIELDS

John Del Rea De Land, Anaheim, Calif.

Application December 17, 1937, Serial No. 180,377

9 Claims. (Cl. 47—26)

My invention relates to a means for controlling the wind for protecting orchards, fields, gardens, or like vegetable or fruit growth against occasional frost and destructive hot winds, and the objects of my invention are:

First, and principally changes, modifications, and improvement in like structures disclosed in my patents for Orchard protective systems disclosed in Letters Patents No. 1,749,068, No. 1,902,-119, and No. 2,039,552, granted to me on March 4, 1930, March 21, 1933, and May 5, 1936, and on my application for Letters Patent for Orchard protective systems, filed in the United States Patent Office February 5, 1937, Serial No. 124,216.

Another object of my invention is to provide a means of this class which is reversible on a vertical axis so that the wind may be deflected upwardly over the growth to be protected in case of hot wind and may be deflected downwardly near the ground in case of danger of occasional frost to occur only occasionally in such localities as Southern California, Florida, and the southern part of the United States;

Another object of my invention is to provide such a means that may be positioned in substantial alignment with the direction of the wind so that it does not affect the air currents or winds when desired;

Another object of the invention is to provide such a means in which stationary angularly positioned louver members are secured in stationary relation upon a frame mounted on a vertical axis;

Another object of my invention is to provide means of this class in which there are only a few movable parts;

Another object of my invention is to provide a means of this class in which several shiftable units may be utilized of various heighths and widths to suit the particular growth to be protected;

Another object of my invention is to provide a means of this class in which the frame and support for the unit are so constructed that a rigid structure which will prevent the pressure of the wind in any reasonable variation of its stages from destroying it; and Another object of my invention is to provide a means of this class which is very simple and economical of construction, stable, efficient in its action, and which will not readily deteriorate or get out of order.

With these and other objects in view as will appear hereinafter my invention consists of certain novel features of construction, combination, and arrangement of parts and portions as will be hereinafter described in detail and particularly set forth in the appended claims, reference being had to the accompanying drawing and to the characters of reference thereon which form a part of this application in which:

Figure 1 is a side elevational view of my wind control means showing one unit and showing fragmentary portions of adjacent units, all supported in the frame; Fig. 2 is a top or plan view thereof showing the one unit in partially turned positions relatively to the frame and showing by dotted lines varying turned positions of the other fragmentary portions of the other units; Fig. 3 is a transverse sectional view taken from the line 3—3 of Fig. 2 and showing by dotted lines a transverse shifted out of operation position of the louver frame and Fig. 4 is an enlarged fragmentary sectional view taken from the line 4—4 of Fig. 1.

Similar characters of reference refer to similar parts and portions throughout the several views of the drawing.

The base members 1, uprights 2, main frame members 3, main frame member supports 4, main frame member support bases 5, louver frame journal 6, louver frame members 7 to 13 inclusive, and louver members 14 constitute the principal parts and portions of my wind control means for protecting orchards and fields.

The base members 1 are preferably cement blocks which are set into the ground a sufficient depth and are of the proper size to provide a rigid support for the uprights 2, the lower ends of which are embedded in said bases 1 and extend upwardly a suitable distance to a heighth substantially above the growth to be protected. This member 2 is reduced near the ground at 2a and these base members 1 and uprights 2 are positioned in a row in spaced relation to each other on the windward side of the orchard or other growth to be protected.

Mounted on the upper ends of these uprights 2, on the reduced portions 2b, is one of the main frame members 3. This main frame member 3 is supported intermediate the upright 2 by means of main frame member supports 4, which are embedded at their lower end in base members 5 which are embedded in the ground. These main frame member supports 4 are positioned substantially at the free sides of the louver frames as shown best in Fig. 1 of the drawing.

Mounted on the uprights 2b and supported on the portion 2a is the louver frame journal 6 which is revolubly mounted upon the small portion 2b of the uprights 2, shown best in Fig. 3 of the drawing. The upright 2 is provided with enlarged collars 2c at the upper end and 2d at the lower end to form bearings for the journal 6 at the upper and lower ends of the upright 2. Secured on the upper ends of the journal members 6 and extending therefrom in opposite directions is the upper louver frame member 7 which extens to adjacent the support 4 at its opposite end, and secured to the lower side of this frame member 7 and extending downwardly are the louver frame members 8, 9, 10 and 11 which extend downwardly to near the ground G. Secured across the lower ends of the frame members 8, 9, 10, and 11, and near the ground are the lower horizontal louver frame members 12 and 13 which are rigidly secured to the journal member 6 at its lower end, shown best in Figs. 1 and 3 of the drawing. This provides two substantially rectangular frames formed of the frame members 7 to 13 inclusive secured rigidly to the journal member 6. In these two frames are mounted the louver members 14 positioned on an angle of substantially 45° and positioned so that the upper edge of one louver member is substantially on the same elevation as the lower edge of the next adjacent louver member as shown best in Fig. 4 of the drawing, thus providing a substantially closed wall when looking at these louver member frames from a substantially horizontal direction, but permitting the deflection of wind upwardly when passing through the same in one direction and downwardly when passing through the same in the opposite direction.

The operation of my wind control means for protecting orchards and fields is substantially as follows:

As pointed out in my previous patents and application for patent set forth in this application, it is well known that high winds often have destructive effects upon growths such as orchards, grains, gardens, and the like, not only in causing direct damage to the growth, but also in preventing their proper growth. Therefore, prior to my invention, wind breaks commonly employed are in the form of tall trees grown along that side of the orchard from which the prevailing wind blows. It is also well known in this art of protection, that hot winds should be deflected at the windward side of the growth to be protected upwardly over such growth to prevent its deteriorating effect upon the growth, and also in case of occasional frost, it is well known that air levels may be directed downwardly, so that by directing the wind currents downwardly near the ground in orchards, it tends to prevent damage by frost. Therefore, in operating applicant's means in case occasional frosts are apparent, the louver frame unit is positioned so that the side with the high side of the louver member is positioned toward the direction the wind is coming. Therefore, the wind is deflected downwardly into and among the growth to be protected, while if hot winds are apparent, the louver frame member should be reversed by turning it in reversed position on the member 2 and the wind current will then be directed upwardly so that it passes over the growth to be protected and therefore prevent the destructive effects of the hot winds. When neither are apparent, the frame member may be positioned so that it is in alignment with the general direction of the wind.

Though I have shown and described a particular construction, combination, and arrangement of parts and portions, I do not wish to be limited to this particular construction, combination, and arrangement, but desire to include in the scope of my invention, the construction, combination, and arrangement substantially as set forth in the appended claims.

Having thus described my invention, what I claim as new and desire to secure by Letters Patent is:

1. In a wind control means for protecting orchards and fields, a wind deflecting louver wall consisting of louver members positioned on an angle in rigid relation to each other and longitudinally horizontal and means for supporting said louvers pivotally mounted on a vertical axis whereby said wall may be reversed in position.

2. In a wind control means for protecting orchards and fields, a wind deflecting louver wall consisting of louver members positioned on an angle in rigid relation to each other and longitudinally horizontal and means for supporting said louvers pivotally mounted on a vertical axis whereby said wall may be reversed in position, means for supporting said louver wall on its pivotal mounting at both its upper and lower end.

3. In a wind control means for protecting orchards and fields, a wind deflecting louver wall consisting of louver members positioned on an angle in rigid relation to each other and means for supporting said louvers pivotally mounted on a vertical axis whereby said wall may be reversed in position, means for supporting said louver wall on its pivotal mounting at both its upper and lower end, said louver wall arranged in a plurality of pivotally mounted units which are provided with their free ends arranged to come in adjacent relation with each other and into alinement with each other.

4. In a wind control means for protecting orchards, fields, or the like, a vertically pivoted louver frame with louvers extending longitudinally horizontal.

5. In a wind control means for protecting orchards, fields, or the like, a vertically pivoted louver frame, and louvers positioned longitudinally substantially on a horizontal plane and on an angle transversely of said frame whereby wind will be deflected upwardly by said louvers when passing through the same in one direction, and downwardly when passing through the same in the opposite direction.

6. In a wind control means for protecting orchards, fields, or the like, a substantially vertical louver wall pivotally mounted on a vertical axis whereby the angle of the louver may be reversed.

7. In a wind control means for protecting orchards, fields, or the like, a substantially vertical louver wall pivotally mounted on a vertical axis whereby the angle of the louver may be reversed, and a supporting structure for said vertical axis.

8. In a wind control means for protecting orchards, fields, or the like, a substantially vertical louver wall pivotally mounted on a vertical axis, a supporting structure for said vertical axis, and a plurality of louver members positioned on an angle transversely with said wall and rigidly secured in position and extending horizontally lengthwise.

9. In a wind control means for protecting orchards and fields, a stationarily supported wind deflecting louver member and means for supporting said louver member in its stationary position, said louver member positioned on an angle to direct the wind downwardly for frost protection.

JOHN DEL REA DE LAND.